(12) United States Patent
Allmark et al.

(10) Patent No.: US 7,174,369 B1
(45) Date of Patent: Feb. 6, 2007

(54) SYSTEM AND METHODS OF UPDATING COMPACT DISC CARDS AND GRAPHICAL USER INTERFACE FOR UPDATING SAME

(75) Inventors: Colin Allmark, Loxwood (GB); Gerald A. Pierson, Orlando, FL (US)

(73) Assignee: DXPDD, Inc., New York, NY (US)

( * ) Notice: Subject to any disclaimer, the term of this patent is extended or adjusted under 35 U.S.C. 154(b) by 287 days.

(21) Appl. No.: 09/596,374

(22) Filed: Jun. 19, 2000

Related U.S. Application Data

(63) Continuation-in-part of application No. 09/587,853, filed on Jun. 6, 2000, now abandoned, which is a continuation of application No. 09/464,059, filed on Dec. 15, 1999, now Pat. No. 6,304,544, which is a continuation of application No. 09/292,285, filed on Apr. 15, 1999, now Pat. No. 6,078,557, which is a continuation of application No. 08/856,915, filed on May 15, 1997, now Pat. No. 5,982,736.

(51) Int. Cl.
 *G06F 15/13* (2006.01)
(52) U.S. Cl. .................... 709/219; 707/104.1; 717/173
(58) Field of Classification Search ................ 709/221, 709/331, 219; 717/163, 173; 719/331, 332; 707/104.1
 See application file for complete search history.

(56) References Cited

U.S. PATENT DOCUMENTS

| | | | |
|---|---|---|---|
| 2,293,301 A | 8/1942 | Mitchell | 274/42 |
| 2,961,922 A | 11/1960 | Schwartz et al. | 88/28 |
| D193,785 S | 10/1962 | Campbell, Jr. et al. | D26/14 |
| 3,302,520 A | 2/1967 | Dimitracopoulos et al. | 88/28 |
| 3,495,839 A | 2/1970 | Kelly | 274/39 |
| 3,691,312 A | 9/1972 | Peterson | 179/100 |

(Continued)

FOREIGN PATENT DOCUMENTS

CH  1537/97  6/1997

(Continued)

OTHER PUBLICATIONS iOra SoftCD website information located at www.iOra.com.

(Continued)

*Primary Examiner*—John Follansbee
*Assistant Examiner*—Jinsong Hu
(74) *Attorney, Agent, or Firm*—Bracewell & Giuliani LLP

(57) ABSTRACT

A system and method for updating a compact disc card (CD-card) includes a computer having software defining a server. The server has first compact disc card updating software for storing compact disc card update data. A plurality of remote computers are in communication with the server through a communications network. Each of the remote computers includes a processor, a memory for storing digital data, a user display for displaying data to a user, and a CD-drive; a CD-card is positioned in the CD-drive of at least one of the remote computers and is capable of storing digital data thereon. Second card updating software on the compact disc card of the remote computer and is in communication with the first CD-card updating software for updating digital data stored on CD-card by storing the updated data in the memory of the at least one remote computer.

9 Claims, 9 Drawing Sheets

U.S. PATENT DOCUMENTS

| | | | |
|---|---|---|---|
| D231,470 S | 4/1974 | Klepa et al. | D26/14 B |
| 3,839,601 A | 10/1974 | Kimura et al. | 179/100.3 |
| 4,014,604 A | 3/1977 | Schwartz | 353/120 |
| 4,091,454 A | 5/1978 | Kauffmann | 360/135 |
| 4,114,181 A | 9/1978 | Itoh | 360/2 |
| 4,486,496 A | 12/1984 | Dezawa et al. | 428/328 |
| 4,592,042 A | 5/1986 | Lemelson et al. | 369/258 |
| 4,680,460 A | 7/1987 | Drexler | 235/488 |
| 4,683,371 A | 7/1987 | Drexler | 235/487 |
| 4,745,268 A | 5/1988 | Drexler | 235/487 |
| 4,812,633 A | 3/1989 | Vogelgesang et al. | 235/487 |
| 4,868,373 A | 9/1989 | Opheij et al. | 235/380 |
| 4,904,853 A | 2/1990 | Yokokawa | 235/487 |
| 4,916,687 A | 4/1990 | Endo | 369/111 |
| 5,043,974 A | 8/1991 | Nakagawa | 369/291 |
| 5,045,676 A | 9/1991 | Kime | 235/454 |
| 5,059,774 A | 10/1991 | Kubo et al. | 235/454 |
| 5,107,099 A | 4/1992 | Smith | 235/449 |
| 5,204,852 A | 4/1993 | Nakagawa et al. | 369/275 |
| 5,411,259 A | 5/1995 | Pearson et al. | 273/93 |
| 5,417,431 A | 5/1995 | Gluck | 273/293 |
| 5,433,035 A | 7/1995 | Bauer | 40/124 |
| 5,441,278 A | 8/1995 | Nalder | 273/296 |
| 5,465,381 A | 11/1995 | Schmidt et al. | 395/800 |
| 5,480,156 A | 1/1996 | Doederlein et al. | 273/237 |
| 5,579,296 A | 11/1996 | Smith et al. | 369/273 |
| 5,600,628 A | 2/1997 | Spector | 369/291 |
| 5,652,838 A | 7/1997 | Lovett et al. | 395/186 |
| 5,717,682 A | 2/1998 | Nomoto | 369/275.4 |
| 5,740,155 A | 4/1998 | Spector | 369/291 |
| D394,648 S | 5/1998 | Rohde | D14/121 |
| 5,844,757 A | 12/1998 | Rose | |
| 5,852,598 A | 12/1998 | Wiest | 369/272 |
| 5,878,434 A | 3/1999 | Draper et al. | 707/202 |
| 5,882,555 A | 3/1999 | Rohde et al. | 264/1.33 |
| 5,924,096 A | 7/1999 | Draper et al. | 707/10 |
| 5,933,826 A | 8/1999 | Ferguson | 707/9 |
| 5,950,198 A | 9/1999 | Falls et al. | 707/8 |
| 5,956,745 A | 9/1999 | Bradford et al. | 711/137 |
| 5,960,465 A | 9/1999 | Adams | 711/208 |
| 5,991,771 A | 11/1999 | Falls et al. | 707/202 |
| D418,502 S | 1/2000 | Friday | D14/121 |
| D419,151 S | 1/2000 | Koedel | D14/121 |
| D419,152 S | 1/2000 | Lowenstein | D14/121 |
| 6,011,677 A | 1/2000 | Rose | |
| 6,016,298 A | 1/2000 | Fischer | 369/75.1 |
| 6,128,652 A * | 10/2000 | Toh et al. | 709/219 |
| D435,853 S | 1/2001 | Mehta et al. | D14/478 |
| 6,446,080 B1 * | 9/2002 | Van Ryzin et al. | 707/104.1 |
| 6,536,039 B2 * | 3/2003 | Sanford | 717/173 |
| 6,762,988 B2 | 7/2004 | Wood | |

FOREIGN PATENT DOCUMENTS

| | | |
|---|---|---|
| CH | 0526/98 | 3/1998 |
| DE | M9503202.9 | 4/1995 |
| DE | M9502679 | 9/1995 |
| DE | 297 08 978 | 5/1997 |
| DE | 297 09 648 | 6/1997 |
| EP | 0 230 069 | 12/1986 |
| EP | 0 292 720 | 4/1988 |
| EP | 0 497 339 | 9/1988 |
| EP | 0 497 340 | 9/1988 |
| EP | 0 343 982 | 5/1989 |
| EP | 0 618 711 | 3/1994 |
| EP | 994425 A2 * | 4/2000 |
| FR | 2 668 277 | 10/1990 |
| FR | 95 5636 | 10/1995 |
| JP | 04 040586 | 2/1992 |
| WO | 99/12159 | 3/1999 |

OTHER PUBLICATIONS

In re: *Diskxpress US, Inc. vs. Spacemark International Corp. and Benjamin J. Everide*; Case No.:6:00-CV-785-ORL19A; U.S. District Court, Middle District of Florida, Orlando Division, "Complaint."

In re: *Diskxpress US, Inc. vs. Spacemark International Corp. and Benjamin J. Everidge*; Case No.:6:00-CV-785-ORL19A; U.S. District Court, Middle District of Florida, Orlando Division, "Defendant's Answer, Affirmative Defenses, Amended Counterclaim and Third Party Complaint."

iOra Mobile Intranet, eSolutions for Mobile Professionals, [retrieved on Jun. 12, 2000]. Retrieved from the Internet: <//www.iora.com>.

iOra SoftCD, eSolution for Mobile Professionals, [retrieved on Jun. 12, 2000]. Retrieved from the Internet: <//www.iora.com>.

Epsilon Technology, [retrieved on Jun. 12, 2000]. Retrieved from the Internet: <//www.iora.com/epsilon/epsilon.htm>.

Partner Program, [retrieved on Jun. 12, 2000]. Retrieved from the Internet: <//www.iora.com/partners/partners.htm>.

Mobile Intranet, [retrieved on Jun. 12, 2000]. Retrieved from the Internet: <//www.iora.com/mobile/mobile.htm>.

iOra Press Release: Shell Mobilizes Health & Safety with iOra, [retrieved on Jun. 12, 2000]. Retrieved from the Internet: <//www.iora.com/media/pressshell.htm>.

iOra Press Release: iOra Wins Award for Innovation, [retrieved on 2000-060-12]. Retrieved from the Internet: <//www.iora.com/media/pressdtismart.htm>.

iOra Press Release: iOra CEO Interviewed on Silicon.com, [retrieved on Jun. 12, 2000]. Retrieved from the Internet: <//www.iora.com/media/SiliconApril.htm>.

iOra Press Release: SmithKline Beecham outs iOra Mobile Intranet at heart of Intranet Strategy, [retrieved on Jun. 12, 2000]. Retrieved from the Internet: <//www.iora.com/media/pressskb.htm>.

iOra Press Release: iOra Announces Mobile Intranet, [retrieved on Jun. 12, 2000]. Retrieved from the Internet: <//www.iora.com/media/pressl.htm>.

iOra Homepage, [retrieved on Jun. 12, 2000]. Retrieved from the Internet: <//www.iora.com/homepage.htm>.

Contact iOra, [retrieved on Jun. 12, 2000]. Retrieved from the Internet: <//www.iora.com/contact/contact.htm>.

iOra SoftCD Solutions (mobile users, training, marketing, reference, E-catalogues), [retrieved on Jun. 12, 2000]. Retrieved from the Internet: <//www.iora.com/solutions/solutions.htm>.

iOra SoftCD, [retrieved on Jun. 12, 2000]. Retrieved from the Internet: <//www.iora.com/softcd/softcd.htm>.

Company Board, [retrieved on Jun. 12, 2000]. Retrieved from the Internet: <//www.iora.com/about/about.board.htm>.

* cited by examiner

SYSTEM AND METHODS OF UPDATING COMPACT DISC CARDS AND GRAPHICAL USER INTERFACE FOR UPDATING SAME

RELATED APPLICATIONS

This application is a continuation-in-part of U.S. patent application Ser. No. 09/587,853 filed Jun. 6, 2000 now abandoned, which is a continuation of U.S. patent application Ser. No. 09/464,059 filed Dec. 15, 1999 now U.S. Pat. No. 6,304,544, which is a continuation of U.S. patent application Ser. No. 09/292,285 filed Apr. 15, 1999 now U.S. Pat. No. 6,078,557, which is a continuation of U.S. patent application Ser. No. 08/856,915 filed May 15, 1997 and which issued as U.S. Pat. No. 5,982,736 on Nov. 9, 1999, all of the disclosures of which are hereby incorporated by reference in their entirety.

FIELD OF THE INVENTION

The present invention relates to the field of multimedia, computers, and multimedia system, and, more particularly, to data storage and compact discs.

BACKGROUND OF THE INVENTION

Over the years, computers have developed to bring tremendous changes to technology, company operations, and various aspects of personal and work lives of individuals. With the widespread advent of computers, multimedia has developed to communicate information, entertain, archive information, and provide information to users of computers and other multimedia systems. Relatively recently, compact discs have been developed for storing and retrieving large amounts of information or data when desired to be accessed by users. Magnetic compact discs, i.e., floppy discs, having a rectangular shape were first developed, and custom magnetic disc readers soon became a standard on many computers. Because of the ability to store even larger amounts of digital data, annular-shaped optical compact discs soon became a standard for storing information such as new software programs. The sizes of these annular-shaped compact discs were about 120 mm, and later 80 mm annular-shaped compact discs were developed. Accordingly, computers and other hardware had optical compact discs as standard equipment for loading software and storing and retrieving other data for users. One of the problems with optical compact discs, however, is that these discs are a type of read-only memory ("ROM") or CD-ROM. In other words, for years it was not possible to write new information to the disc. Accordingly, magnetic compact discs did not and have not yet become obsolete. The cost effective manufacturing and widespread distribution of the CD-ROM, however, continues to make it attractive to users.

In response to this limitation of not being able to write to optical compact discs, technology was developed to try to make optical compact discs more like magnetic compact discs. These compact discs have the ability to read and write information to the discs and are often called writeable compact discs or CD-Rs or CD-RWs. Other hybrid formats have been developed which allow both ROM type qualities and reading and writing qualities on the same disc. An example of such a hybrid disc can be seen in U.S. Pat. No. 5,204,852 by Nakagawa et al. titled "Optical Disc-Like Recoding Medium And Manufacturing Method Thereof." Such CDRs, CD-RWs, and hybrids, however, can be difficult and expensive to manufacture, have a very small user base, the writers for the format are not yet commonplace, and in some instances provide a much greater reduction in storage and read/writing capacity than the conventional optical compact discs.

Also, in response to this limitation of not being able to write to an optical compact disc, many companies attempted to develop optical compact discs with integrated circuits associated therewith or a magnetic strip associated therewith. Examples of such compact discs can be seen in U.S. Pat. No. 5,465,381 by Schmidt et al. titled "Processor And Read/Write Head Incorporated In Disk For Communicating Data To Host Directly From Processor Read/Write Head To Read/Write Head of Host Disk Drive" and U.S. Pat. No. 5,652,838 by Lovett titled "Smart Disc CD-ROM." The problem with such new developments, however, is that such custom type of compact discs require a special or custom reader. The current user base has a conventional compact disc reader. In other words, computer or other hardware manufacturers would have to adopt a new type of reader and this is not being done. Much of this lack of adopting a new reader may be uncertainty over the new format of the storing and reading media. These custom compacts discs having integrated circuits associated therewith also are more expensive to manufacture and quality and other manufacturing, distributing, reading, and writing problems can occur more readily as well.

Other formats of storing information such as digital video discs ("DVDs") have been developed as well. DVDs are another format for compact discs which provide enhanced formatting and view of digital video. This technology, however, is in many ways only an extension of the CD-ROM technology. Although starting to become more widespread, this technology also requires a separate or new computer drive for users.

Even more recently, compact disc trading or business cards have been developed which have a non-round shape and which are capable of handling DVD, hybrid, and CD-R or CD-RW formats as well. An example of such a card can be seen in U.S. Pat. No. 5,982,736 by Pierson titled "Trading Card Optical Compact Disc." Although these cards store less information than the conventional larger annular-shaped optical compact discs, these cards advantageously can be used in the same disc readers as the conventional annular-shaped compact discs. In other words, the computer industry does not need to produce custom disc readers to handle these compact disc cards because these cards are compatible with disc drives for the larger 120 mm or 80 mm disc drives.

Additionally, global communications networks, such as the Internet, have been developed so that their use has become much more widespread. A global communications network advantageously allows users throughout the world to communicate via computer network links. One company, Iora Inc. of Burlingame, Calif. and Iora Ltd. of Basingstoke, Hampshire, United Kingdom, along with Novell, Inc. of Orem, Utah, has developed a file comparison and replication technology, e.g., SoftCD, which allows compact disc information to be updated through a communications network such as the Internet. Examples of some of the patents related to updating compact discs through the Internet can be seen in U.S. Pat. No. 5,991,771 by Falls et al. titled "Transaction Synchronization In A Disconnectable Computer And Network," U.S. Pat. No. 5,950,198 by Falls et al. titled "Processes And Apparatuses For Generating File Correspondency Through Replication And Synchronization Between Target And Source Computers," U.S. Pat. No. 5,924,096 by Draper et al. titled "Distributed Database Using Indexed Into Tags To Tracks Events According To Type, Update Cache, Create Virtual Update Log On Demand," and U.S. Pat. No. 5,878,434 by Draper et al. titled "Transaction Clash Management In A Disconnectable Computer And Network." This technology allows a user to insert an optical compact disc into a disc drive and have the compact disc periodically updated through the Internet by writing information to a hard drive or other memory of the user's computer instead of the disc itself. This advantageously allows the user to purchase and use a compact disc and yet have the information on the compact disc to become stale or obsolete.

It was originally thought by many that the Internet would greatly reduce or destroy the CD-ROM market. Instead, large computer and software companies and Internet Service Providers ("ISPs") have distributed millions and millions of CD-ROMs. Although this technology of updating compact discs through a global communications network such as the Internet is helpful, there is still a need for a more flexible, user friendly, and complete systems or methods for updating compact discs and especially compact disc cards.

SUMMARY OF THE INVENTION

With the foregoing in mind, the present invention advantageously provides a system and method for updating compact disc cards which is more flexible and user friendly. The present invention also advantageously provides a system and method for updating compact disc cards which allows users of the cards to more readily, easily, and quickly update the information or data on the card. The present invention advantageously recognizes that compact disc technology is a tremendous asset to the expansive use of a global communications network such as the Internet because this technology provides the support, the log on mechanism, the bulk data, video and multimedia content that the Internet fins hard or even impossible to deliver by itself. The present invention also recognizes that compact disc technology is complimentary to the Internet and takes advantage of this recognition by providing a graphical user interface that enhances updating of compact disc cards through a global communications network such as the Internet. The present invention further provides a system and method of updating compact discs which does not require major new investments in existing computer machinery because the user base already exists. Even still, the present invention still takes advantage of changing technology to provide flexible adaptation to other information delivery formats such as CD-R, CD-RW, hybrid, DVD, and other formats as understood by those skilled in the art.

More particularly, a system and method for updating a compact disc card is provided which preferably has a computer having software stored thereon defining a server. The server has first compact disc card updating software associated therewith for storing compact disc card update data. A communications network is preferably positioned in communication with the server, and a plurality of remote computers are preferably in communication with the server through the communications network. Each of the plurality of remote computers preferably includes a processor for processing digital data, a memory in communication with the processor for storing digital data, a user display in communication with the processor for displaying data to a user, and a compact disc drive positioned to receive at least one compact disc card therein. A compact disc card is positioned in the compact disc drive of at least one of the remote computers and is capable of storing digital data thereon. The compact disc card preferably includes a seating ring interface seat associated with the compact disc card, second card updating software stored on the compact disc card and in communication with the first compact disc card updating software for updating digital data stored on compact disc card by storing the updated data in the memory of the at least one remote computer so that the update appears to the user to be on the compact disc card. A graphical user interface is stored on the compact disc card for producing a graphical user interface for display on the users display of the at least one remote computer to enhance and speed up user update capabilities to the compact disc card.

The present invention also provides a graphical user interface which enhances and speeds up update capabilities to a user of the compact disc card. The graphical user interface preferably has interface displaying means for displaying a graphical user interface on a user display of a remote computer and directing means for graphically directing a user through a plurality of blocks for updating stored digital data in memory of at least one remote computer so that the update appears to the user to be on a compact disc card. The directing means preferably includes software loading means displayed to a user for loading card updating software into the memory of the at least one remote computer responsive to the user. The graphical user interface also preferably has update initiating means associated with the card updating software for initiating the updating of the updated data from remote card updating software, e.g., card updating software on a server.

The graphical user interface of the present invention advantageously automates the process of updating a compact disc card and informs the user of the blocks required for such automated update. In turn, the user friendly interface enhances the update capabilities and provides a seamless interface between users and updating functions.

The present invention further provides a method of updating a compact disc card. The method preferably includes providing first compact disc card updating software associated with a computer defining a server for storing compact disc card update data and positioning a compact disc card in a compact disc drive of at least one remote computer capable of storing digital data thereon. The compact disc preferably includes a seating ring interface seat associated with the compact disc card. The method also preferably includes providing second card updating software stored on the compact disc card and in communication with the first compact disc card updating software through a communication link, updating digital data stored on the compact disc card by storing the updated data in the memory of the at least one remote computer, and producing a graphical user interface to enhance update capabilities to a user of the compact disc card.

The method can also include directing a user through a plurality of blocks by the graphical user interface on a display of the at least one remote computer to thereby update stored digital data in memory of the at least one remote computer so that the update appears to the user to be on a compact disc card, loading card updating software into the memory of the at least one remote computer responsive to the user, and initiating the updating of the updated data from remote card updating software.

The present invention is particularly advantageous in use with a communication network such as the Internet or an Intranet because the Internet, for example, has become widely used for communication, information distribution, training, and other functions. Because the information or data used for these purposes or function can change, the present invention greatly reduces or limits the need for static information such as provided in the conventional CD-ROM format. Also, because the distribution of information is quicker, when CD-ROMs or other related technologies as described in the background are distributed to users, the content information, e.g., a price, a new product, a news item, an important specification, a delivery schedule, a product recall, a health or safety update, legislation, statistical, or other information, may have changed or may change shortly thereafter. Because users are already using CD-ROMs and are familiar with their format, the users also advantageously do not need to be re-educated or re-trained on other formats to use the present invention.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
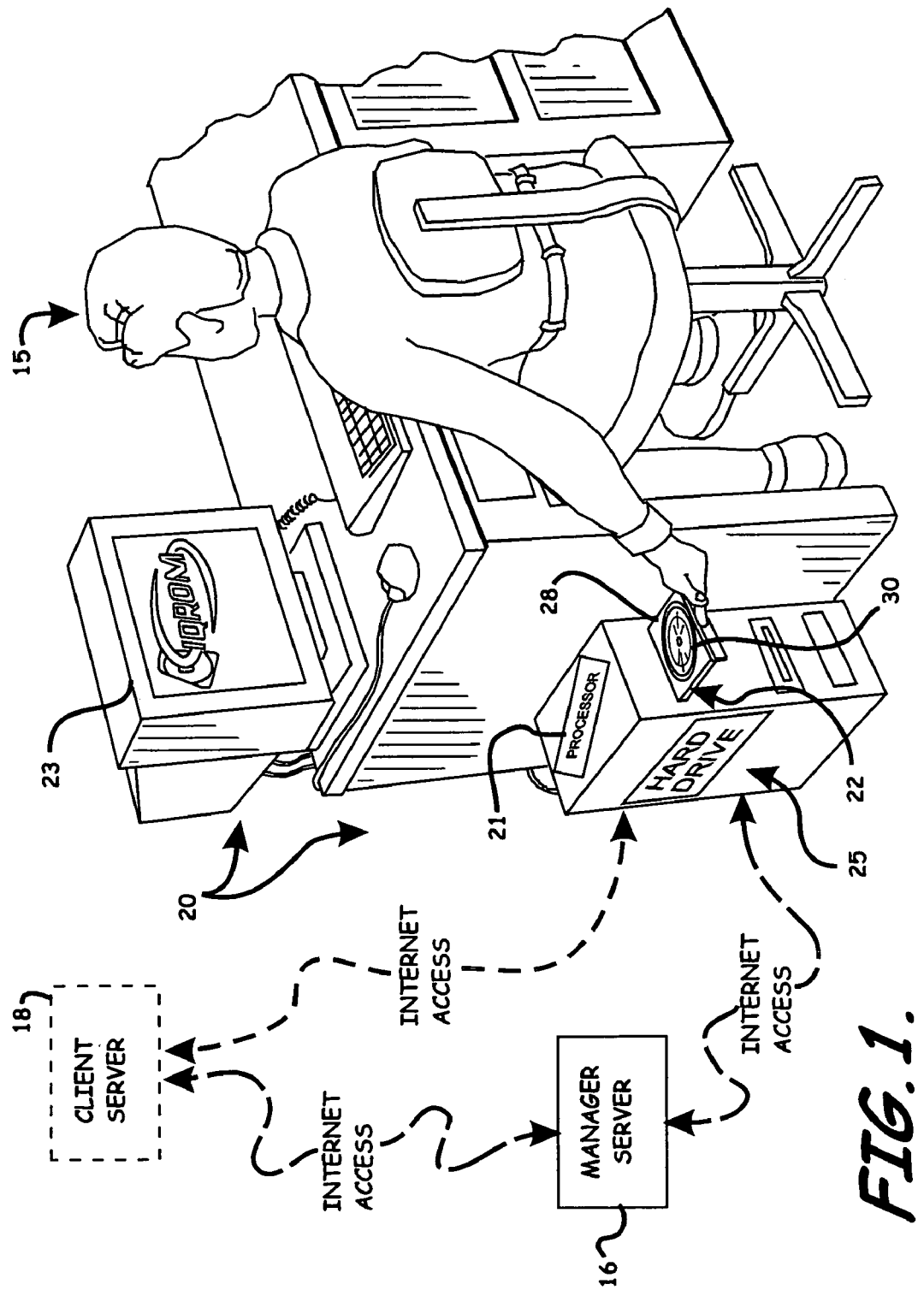
FIG. 1 is an environmental perspective view of a system for updating a compact disc card and showing a user updating a compact disc card according to the present invention.
Figure 3:
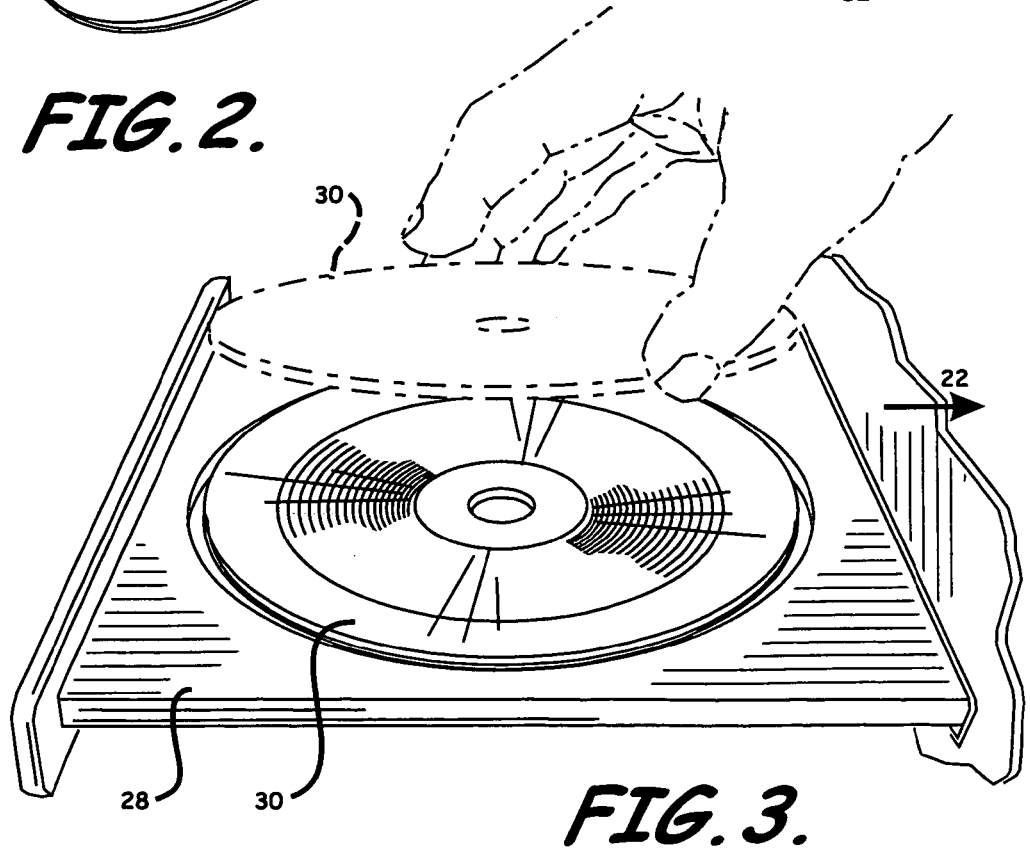
FIG. 3 is a fragmentary perspective view of a user loading a compact disc card onto a disc loading tray of a system for updating a compact disc card according to the present invention.
Figure 4:
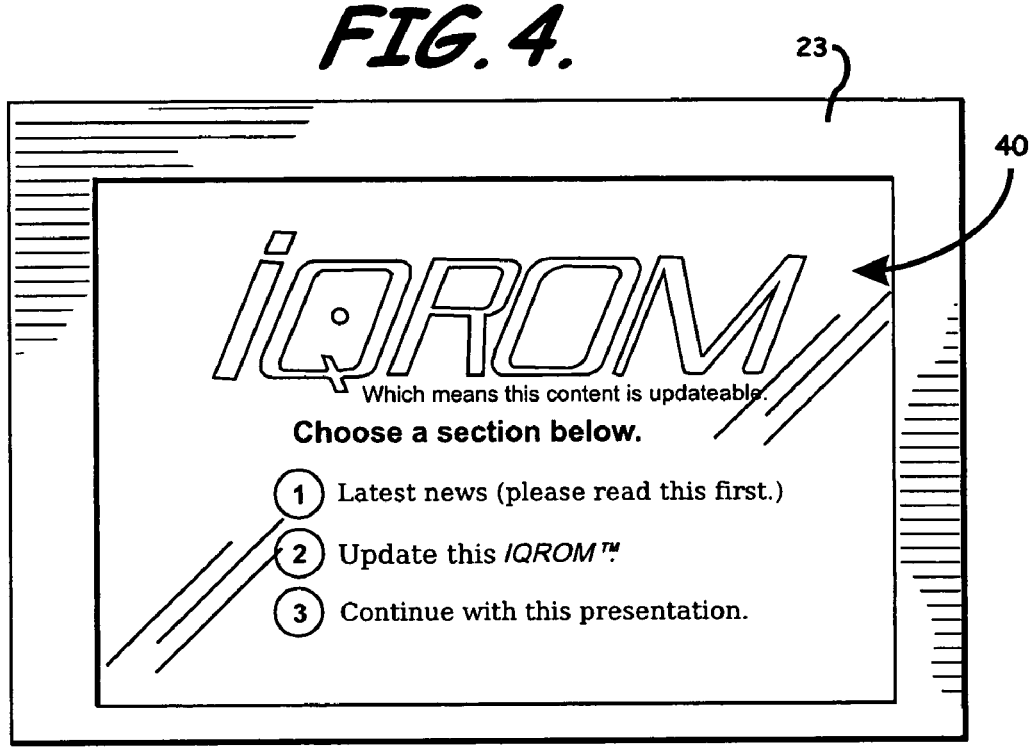
FIG. 4 is a front elevational view of a first display screen of a graphical user interface of a system for updating compact disc cards according to the present invention.
Figure 5:
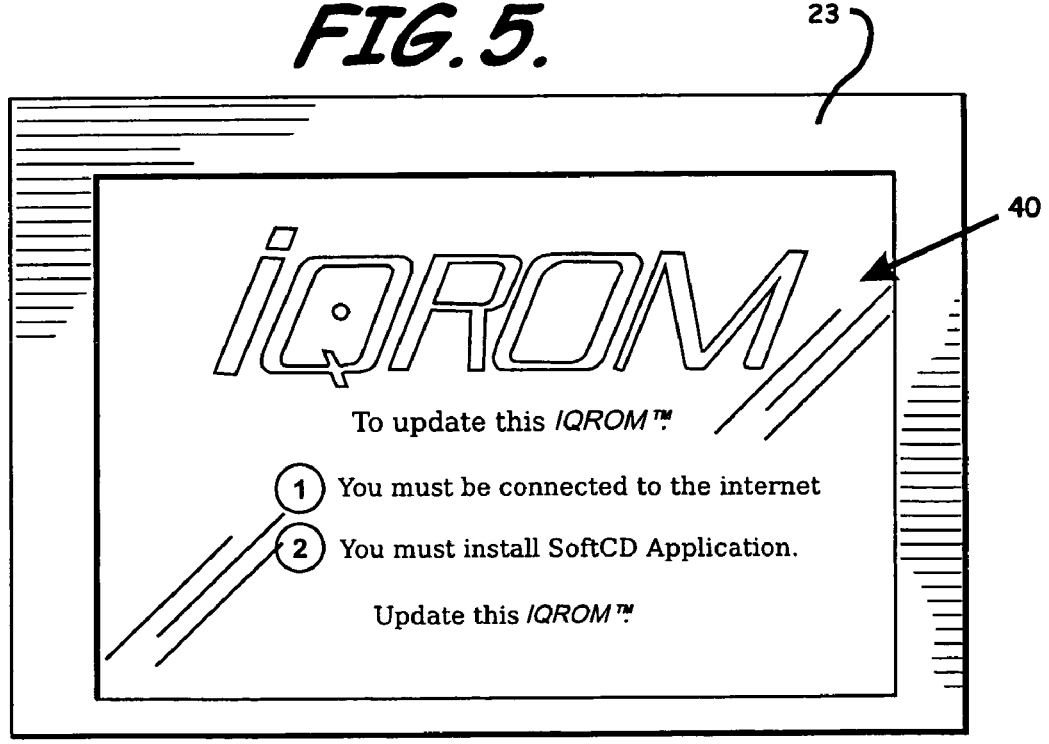
FIG. 5 is a front elevational view of a second display screen of a graphical user interface of a system for updating compact disc cards according to the present invention.
Figure 6:
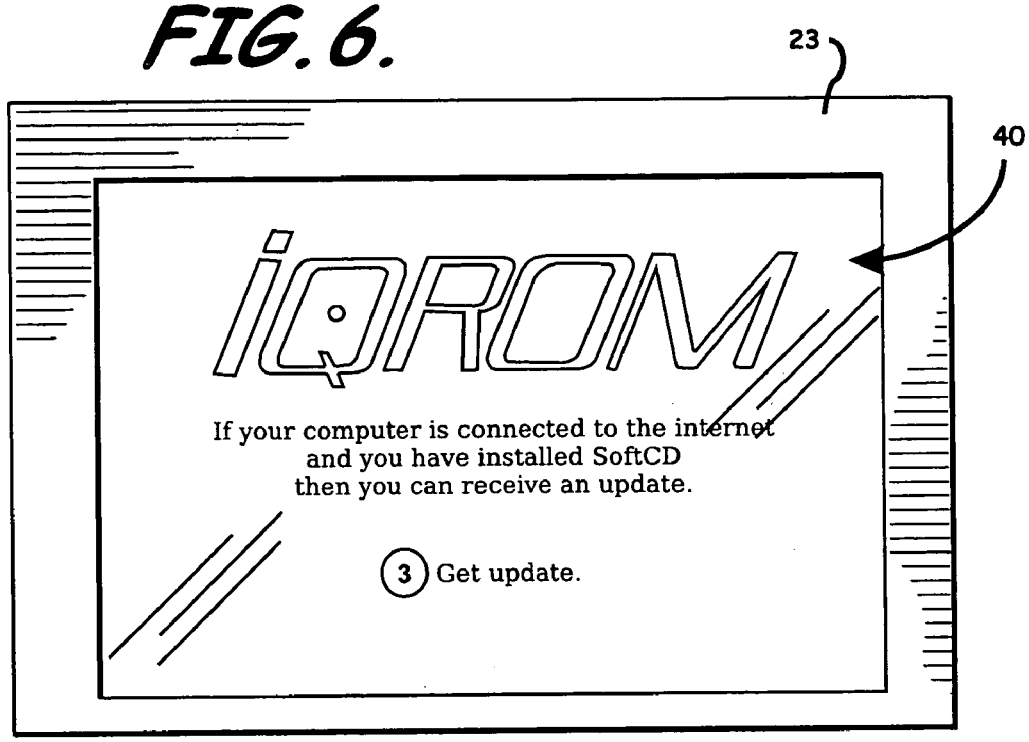
FIG. 6 is a front elevational view of a third display screen of a graphical user interface of a system for updating compact disc cards according to the present invention.
Figure 7:
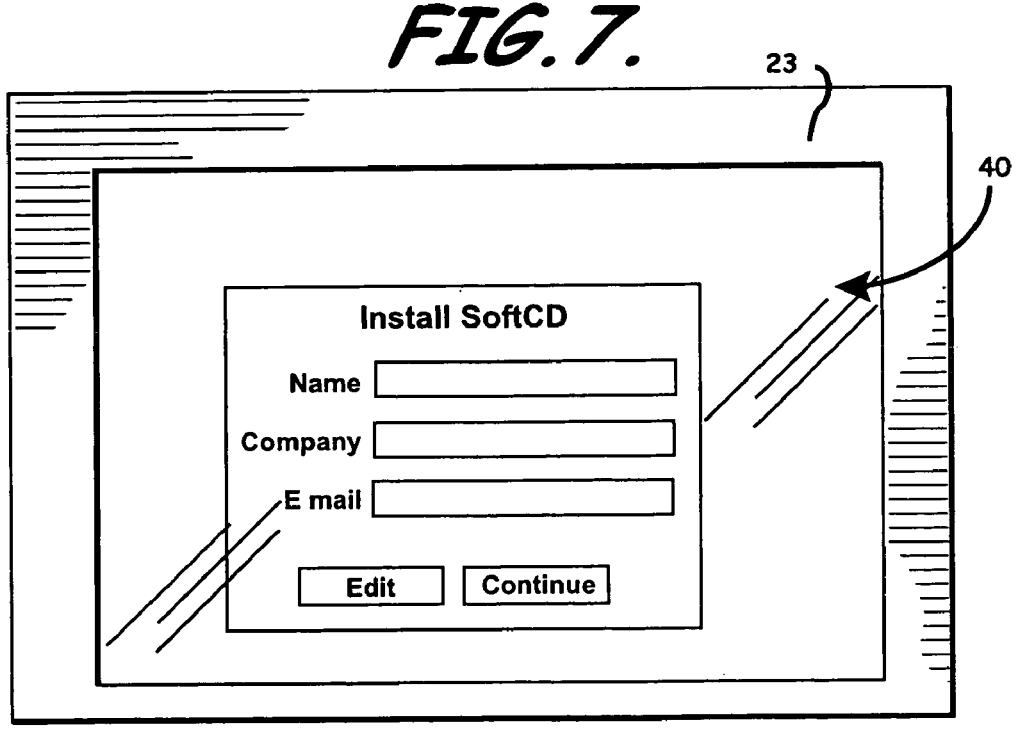
FIG. 7 is a front elevational view of a fourth display screen of a graphical user interface of a system for updating compact disc cards according to the present invention.

FIGS. 1 and 3 illustrate a user updating a compact disc card through a global communications network 12, e.g., the Internet, by the use of a system 15 for updating the same. Although this description is in the context of the Internet, other communication networks 12, e.g., Intranet, can be used as well according to the present invention. The compact disc card 30 is preferably a compact disc card such as described in U.S. Pat. No. 5,982,736 by Pierson titled "Trading Card Optical Compact Disc" which is incorporated herein by reference in its entirety. Such compact disc cards have about 30–50 Megabytes (Mb) of storage capacity without compressing the data or without adopting a DVD format, other format, or other type of compact disc reader 22. As understood by those skilled in the art, and even though for brevity the description herein is in the context of conventional optical compact discs or disc cards, e.g., CD-ROM, the present invention is also applicable to CD-R, CD-RW, hybrid, and DVD formats as well as the optical compact disc or CD-ROM format. The updating capability is preferably as defined by SoftCD, namely SoftCD Client and/or SoftCD Publisher by Iora Ltd. or Iora Inc., and more preferably by SoftCD (Version 2.0 or higher) which is also incorporated herein by reference in its entirety. The present invention preferably operates in tandem with or as an improvement to SoftCD to provide an enhanced system 15 and methods for updating compact disc cards.

According to the present invention, a CD-ROM card 30, for example, is preferably manufactured in the same way as currently done and described in U.S. Pat. No. 5,982,736 and distributed to the end user. The CD-ROM card 30 preferably contains two aspects. First, the card 30 has card updating means in the form of intelligent software that enables the user to receive updates to any updatable compact disc card 30 so that once the user's computer 20 is enabled the user can receive updates to any updatable compact disc card 30 (see FIG. 2). As understood by those skilled in the art, the user's computer 20 preferably includes a processor 21 for processing digital data, a memory, e.g., within hard drive 25, in communication with the processor 21 for storing digital data, a user display 23 for displaying graphical data to a user, and a compact disc driver or reader 22 in communication with the processor 21 for reading data from a compact disc card when positioned therein. The compact disc drive 22 also preferably includes a loading tray or device 28 for loading the card to the reader 22. Second, a link from the updatable compact disc card 30 to an Internet server or computer having software loaded thereon which defines a server 16 (see FIGS. 1–2). This is the location where the updatable compact disc card 30 can responsively retrieve updates or amendments in the future.

According to the present invention, it will be understood that the information that is transmitted to the hard drive 25 or other storage medium of the computer 20 of a disc user is preferably only the differences between the original content 31 of the compact disc 30 and the amendment 32 or updates. This greatly reduces the amount of information sent and greatly increases the speed of providing updates to users. Therefore, this is where SoftCD software, e.g., a file comparison and replication technology, can advantageously be used according to the present invention.

This SoftCD software can advantageously be used because it makes such a comparison at a low level so that is it only looking for actual changes in digital information, not whole files, documents, or programs. This software also advantageously does not need to know what the data is, e.g., it could be video, music, web pages, word documents, or other data types. The changes, in essence, are usually substantially insignificant to the whole original content of the compact disc card 30. Once the software collates the changes, the software compresses the data to be changed to be even more efficient, and creates an amendment file. An amendment file 32 is the physical differences between the original content 31 of the compact disc card 30 and the new data. Therefore, any download of these changes is insignificant and very quick in comparison to traditional methods.

As understood by those skilled in the art, SoftCD software preferably has SoftCD Client 36 and SoftCD Publisher 38. The SoftCD Publisher 38 is preferably resident on the computer or server 16 or 18 of the company or individual trying to create the update of the content of the compact disc card 30. The "Client" software 36 is an executable installer which installs the "Client" software 36 onto a user's computer 20, e.g., hard drive 25. This software is currently for Microsoft Windows Users only (Windows 95, 98, 2000, and NT). This installer is approximately 3.0 Mb as an executable file (SoftCD Client 36). When installed on a Windows based computer or machine, the software allows for the manageability and updating of a publication. SoftCD Client 36 then becomes active in the Windows environment (API) as understood by those skilled in the art. SoftCD Client 36 is now able to recognize an update to a publication when received and apply it. SoftCD Publisher 38, in turn, is an executable installer which installs "Publisher" software onto a machine or computer which creates the update or amendment. This software is also currently for Microsoft Windows Users only (Windows 95, 98, 2000, and NT). This installer is approximately 3.0 Mb as an executable file (SoftCD Publisher 38). When installed on Windows based computers or machines, the software allows the creation of "Amendment Files" 32 and the manageability of a publication(s).

SoftCD Publisher 38 also creates a "Link File" 33 which is a text based filed which contains information or data that tells SoftCD Client 36 where to find an "Amendment File." For example, "location of the amendment index is at:

http://www.iqrom.com/amendments/publication or A:/amendments/publication (on a floppy or magnetic disc) or a combination of locations. An "Index File" 34 tells SoftCD Client 36 which is the correct "Amendment File" 32 and how many amendments 32 there are or that have been created.

An "Amendment File" 32 is a file created by SoftCD Publisher 38 as described above and which contains the differences between versions of a "publication." The publication is the content of a compact disc card 30. Amendment Files 32 are specific to a particular publication and can also run consecutively. This Amendment File 32 is created by SoftCD Publisher 38 when SoftCD Publisher 38 is asked to compare an original updatable compact disc content 31 with a newer version of the content 32. This is normally held on the Publisher's (computer or server 16 or 18) hard disc drive. When the Amendment File 32 is created, it must be located at the location specified by the Link File 33. This is normally an FTP location on a web server, but is not limited to a web server. It could be a floppy disc, CD-ROM, hard disc drive location, e-mail attachment, web page, or server on an Intranet.

Figure 8A:
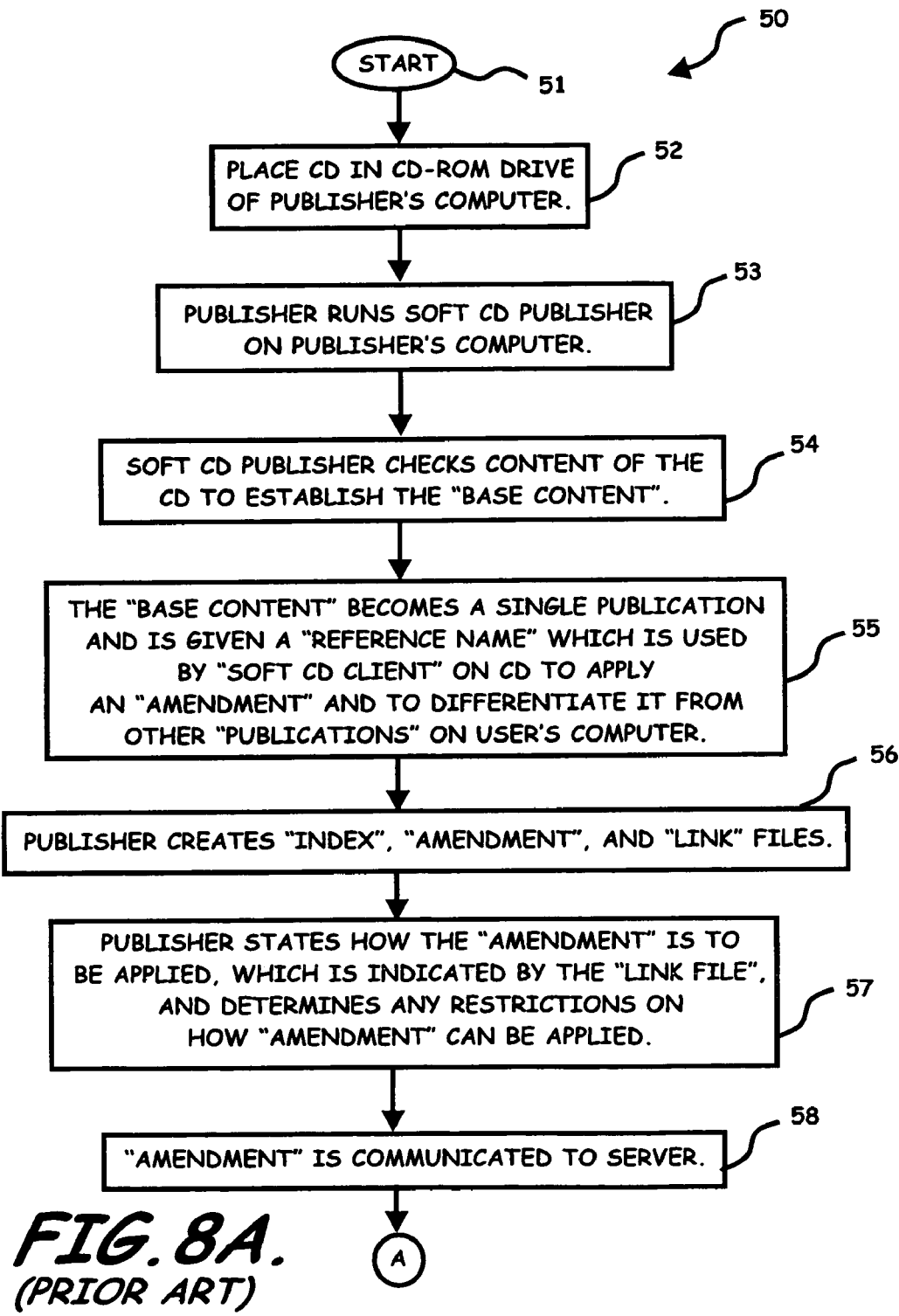
FIGS. 8A–8B are schematic flow diagrams of a method of updating a compact disc according to the prior art.
Figure 8B:
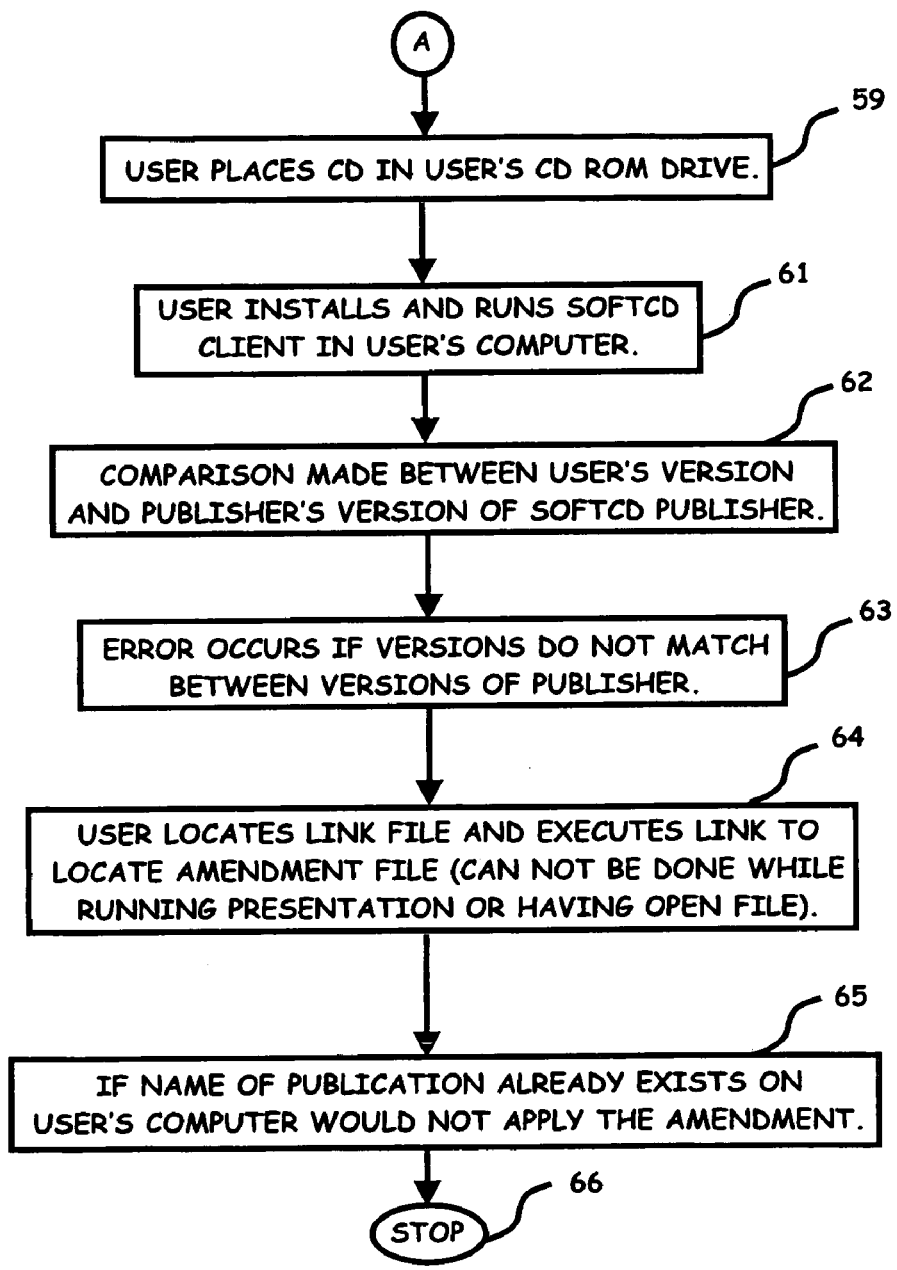

As shown in FIGS. 8A-8B, the following blocks 50, for example, illustrate how this update occurs. First (or after start 51), an original updatable compact disc card 30 (one which has been manufactured) or a CD-R "Gold Master" (a Gold Master is the original data to be manufactured onto an updatable compact disc card and which should be identical to the manufactured updatable compact disc card 30 when produced) is placed in a CD-ROM drive of the Publisher or Computer 16 or 18 making the amendment 52 (see FIG. 1). The updatable compact disc card or Gold Master should also contain a Link File 33 and SoftCD Client 36 (see FIG. 2). Second, the Publisher computer runs SoftCD Publisher 38 (see block 53 of FIG. 8A).

Third, SoftCD Publisher 38 needs to know the content of the updatable compact disc card 30 as a reference (to establish the "base content" (the "base content" is the original data 31 which is desired to be changed or amended)) 54. This can be any part, or the entire contents of an updatable compact disc card 30, but often are the entire contents of such a card including a Link File 33 and SoftCD Client 36 (the main root directory and all files from it).

Then fourth, this base content 31 becomes a single publication and is given a reference name by the user 55. This reference name is used by SoftCD Client 36 to apply an "amendment" 32 and to differentiate it from other "publications" after amendment, index, and link files are created 56. Fifth, the Publisher also states how the "amendment" is to be applied which is indicated by the Link File 57. For example, "apply amendment to entire contents 'base content' which can be found from an FTP location at http://www.iqrom.com/amendments/publication1 only. This will limit the amendment file to being applied only from that location and only to the CD-ROM drive. Sixth, the Publisher also determines any restrictions on how the amendment can be applied 57.

Once the publication is created, it will in turn create three files, namely an "Index File" 34, an "Amendment File" 32, and a "Link File" 33. The Index File 34 should be posted to the location specified by the Link file 33. It should be the correct Index File 34 relating to the latest version of amendments. The Amendment File 32 should also be in the location specified by the Link File 33. The Link File 33 should be on the original Gold Master and all manufactured updatable compact discs 30. The amendment 32 can then be communicated to the server 16 or the publisher computer can act as a server 18 for sending updates 58 to a user's computer 20 (see FIG. 1).

The user places an updatable card in the disc drive 22 of the user's computer 20 (see step 59 of FIG. 8B), and the user manually installs and runs SoftCD Cleint 36 on the user's computer through searching and locating files from the card 30 and using a series of commands 61. These steps are often difficult, especially with respect to the skill level of an average user, and often takes extensive computer knowledge to complete. A comparison is made between user's version and publisher's version of SoftCD Publisher 62. An error occurs if the versions do not match 63. The user then is required to locate the Link File 33 and execute it to locate the amendment file 32 (step 64). Also, if the name of the publication already exits on user's computer, no amendment would be applied 65. Otherwise, the card is updated, and the user can use the new updated material 66.

Some needs and/or problems, however, still exist with the current SoftCD process. For example, the user of an updatable compact disc card 30 does not know how the updating process works. Also, SoftCD Client 36 must be installed on the user's computer 20 or machine, and it must be the correct version to match the "Publication" version. In other words, SoftCD Client 36 cannot be a lesser version than the Publication. Otherwise, errors will occur, and the amendment 32 will not apply. Additionally, the Link File 33 must be executed to locate the "Amendment Files" 32. The user must be informed of its existence and activate the execution of the file with a mouse or other command. This cannot be done while running a presentation.

Further, versions of Windows cannot update or change open files. Therefore a user cannot update the content that is open, and the user cannot apply an amendment to it. Also, Unix web servers do not understand the "+" sign which some versions of SoftCD Publisher creates as a tag to the Amendment File 32. For example, Pulbication1 +1.orl (the name of the "Amendment File"). The Amendment File 32 could be stored on a Unix Web Server (and will not be located). Further still, the name of the Publication already exists on the users machine (in SoftCD Client Manager) yet it is not the same publication. This will not apply an update. Finally, the whole process is complicated and prone to user error or unacceptability by the user to perform the required blocks.

Figure 9A:
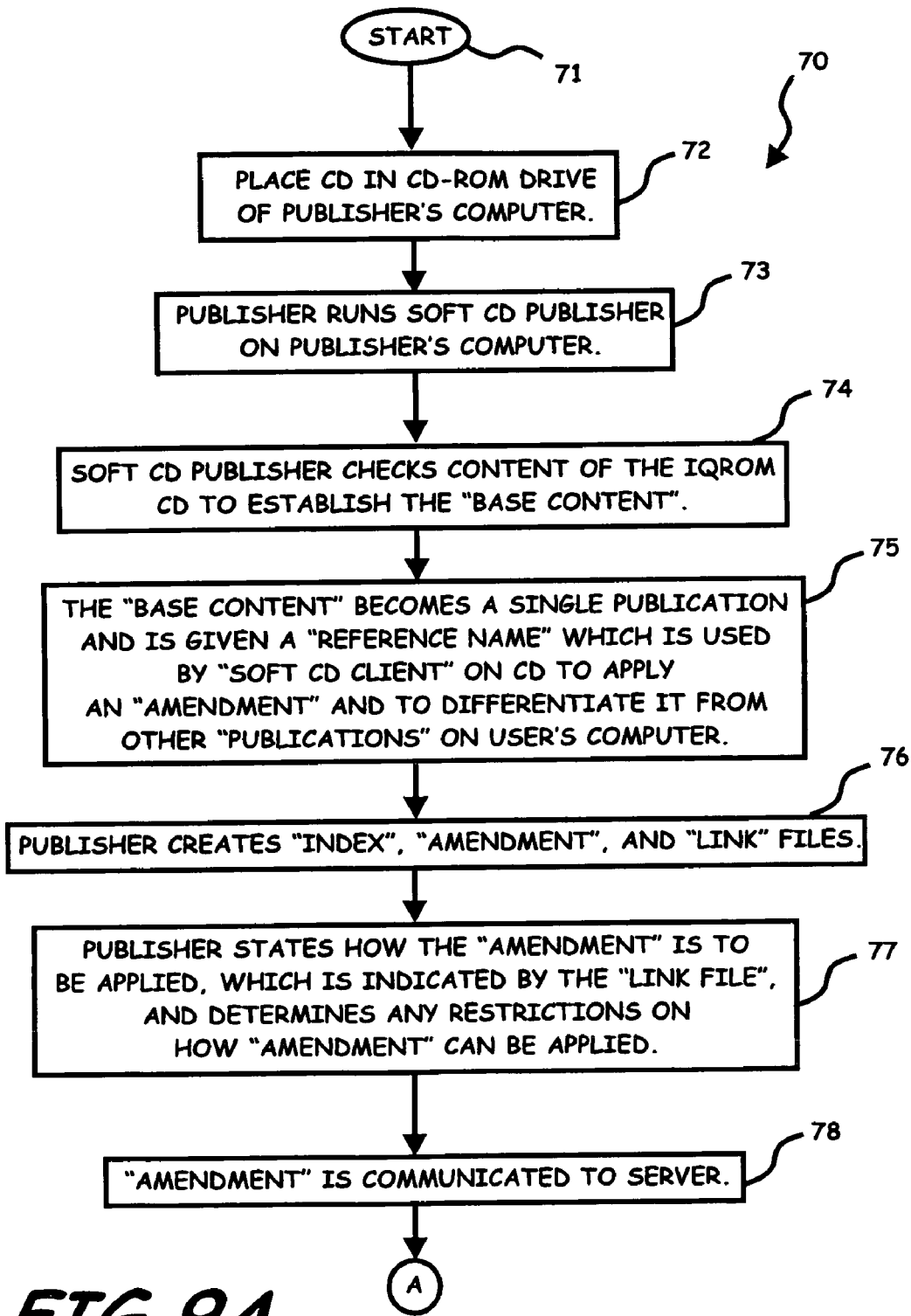
FIGS. 9A–9B are schematic flow diagrams of a method of updating a compact disc card according to the present invention.

Accordingly, the present invention advantageously addresses these problems by enhancing the background updating process to greatly reduce or alleviate user error or unacceptability by the user to perform the required updating blocks. The updating process 70, as shown in blocks or steps 71–78 of FIG. 9A, are similar to those in FIG. 8A. The steps in FIG. 9B, however, are significantly different. The present invention also enhances the removal of an "amendment" or "publication" before applying a new one to the same "publication." This advantageously avoids incremental updates and enables more uses of the updatable function and individual user-tailored applications. The present invention also provides a process for enhancing the version update of SoftCD Client 36 within a user interface 40 via a communications network 12 such as the Internet for user with older incompatible versions of SoftCD Client 36. The present invention also enhances the ability to provide multiple publications and amendments 32 (yet none conflicting) to the same original updatable compact disc card 30 and the ability to manage different data for different users to be able to tailor the data for individual user groups, e.g., via a menu, a web server, or password system.

The present invention further advantageously provides the ability to locate Amendment Files 32 within a web page to enable download via any web browser by providing a web browser plug-in based interface which can be used to seamlessly apply amendments 32 while on-line, and with an offline "automatic" launch if desired. As understood by those skilled in the art, the present invention still further provides management or control of how often to check (time, date, frequency) for new amendments 32 or updates so that the user does not have to remember to check. The system 15 can provide password protection which can be linked to different publications and amendment files, restriction of access to unauthorized users of amendment files, and the ability to readily unlock encrypted versions of SoftCD when desired or allowed.

In essence, as shown in FIGS. 4–7 and 9A–9B, the system 15 of the present invention provides a graphical user interface 40 independent of SoftCD Client 36 which enhances the user updating process and informs the user of the blocks required. The system 15 checks the users machine 20 to establish if SoftCD Client 36 is installed and that it is the correct version. If not, then the correct version can then be installed from the updatable compact disc card 30. The Link File 33 can be executed with the graphical user interface 40 or within the contents of the updatable compact disc card 30. This can be done responsive to loading, some other event, or by informing the user to press a button. This would then launch the Link File 33. The system 15 provides an independent user interface 40 the content of which does not change and is not affected by the updating functions so that problems with the user can be greatly reduced or avoided. By changing the Windows registry entries on the publisher's machine, the system 15 replaces the "+" sign with a "−" sign which Unix servers can interpret.

Figure 2:
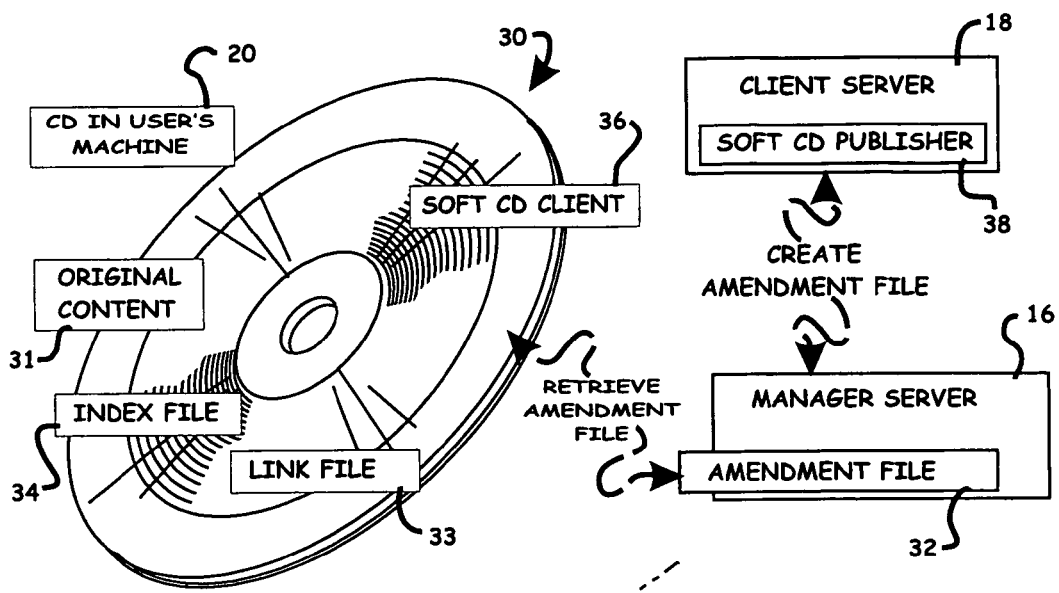
FIG. 2 is a schematic perspective view of a compact disc card having card updating software stored thereon according to the present invention.

Preferably, as shown in FIG. 2, SoftCD Client 36 and the specific "Link File" 33 are distributed on the updatable compact disc card 30 in an executable format (installer), and SoftCD Publisher is not distributed to the user. Afte the card is loaded into a user's disc drive 79, the graphical user interface 40 preferably provides an automatic run facility or location which launches a multimedia generating language 81, as understood by those skilled in the art, such as a Macromedia Director Application by Macromedia, Inc. of San Francisco, Calif., which contains the user interface 40 to do the following:

(1) Inform the user of the process of updating the compact disc card 30 (blocks 82–83); (2) install SoftCD Client 36 without having to locate it on the compact disc card 30 (block 84); (3) Launch the Link File 33 without having to locate it on the compact disc card 30 (block 85); (4) Provide a seamless interface between the users content and SoftCD functions; (5) Launch an independent Macromedia Director "Movie" file from within a Director Projector which does not need to be updated and therefore does not interfere with the Windows open file problem (block 86); (6) By running a third party Xtra from within Macromedia Director to access the windows API to search for, locate, and launch the Link File 33; and (7) By running a third party Xtra from within Macromedia Director to access the windows API to search for, locate, and launch the SoftCD Client 36. The user can then readily choose to update the card content (block 87), and the amendment file 32 is applied to the base contents within restrictions provided or associated with the card size and shape. A seamless interface for updating cards is then provided.

The graphic user interface 40, for example, can be written in C++ programming language as understood by those skilled in the art to launch an independent application which opens and closes responsively to eliminate the Windows open file problem and the Macromedia Director Projectors inability to be updated when open. By using a C++ application, for example, to change the Windows registry settings, from "+" to "−" eliminates the Unix web server problem. The system 15 is preferably provided by the use of Macromedia Director 6.5 or higher, as understood by those skilled in the art and which is incorporated herein by reference in its entirety, Buddy API Xtra's for Macromedia Director, and C++ programming language. It will be understood by those skilled in the art, however, that additional external programming in a development language like C++, Visual Basic, HTML, or Java to operate stand-alone can be used as well. These form the basis of a set of programmable tools to tailor the user interface 40 of the system 15 for particular client applications and to eliminate problems associated with files, sizes, and types.

As perhaps best shown in FIGS. 4–7 and 10, the graphical user interface ("GUI") 40 preferably includes an interface display, such as user display generator 42, responsive to user interaction, e.g., clicking of mouse or keyboard stroke, which displays or launches a display of the graphical user interface on the user display of a computer. The GUI 40 also preferably includes a user director 45 which visually directs a user through a plurality of blocks, e.g., see FIGS. 4–6, for updating the stored digital data in the memory of the computer 20 so that the update appears to be on the card 30. The user director 45, preferably a software loader, is positioned to load the card updating software on the card 30 into the memory of the computer 20. The GUI 40 can also include a user update initiator 48 for initiating the updating of the card responsive to user interaction with the GUI 40. These portions of the GUI 40 are preferably provided by software modules, as understood by those skilled in the art, stored on the card 30.

Figure 9B:
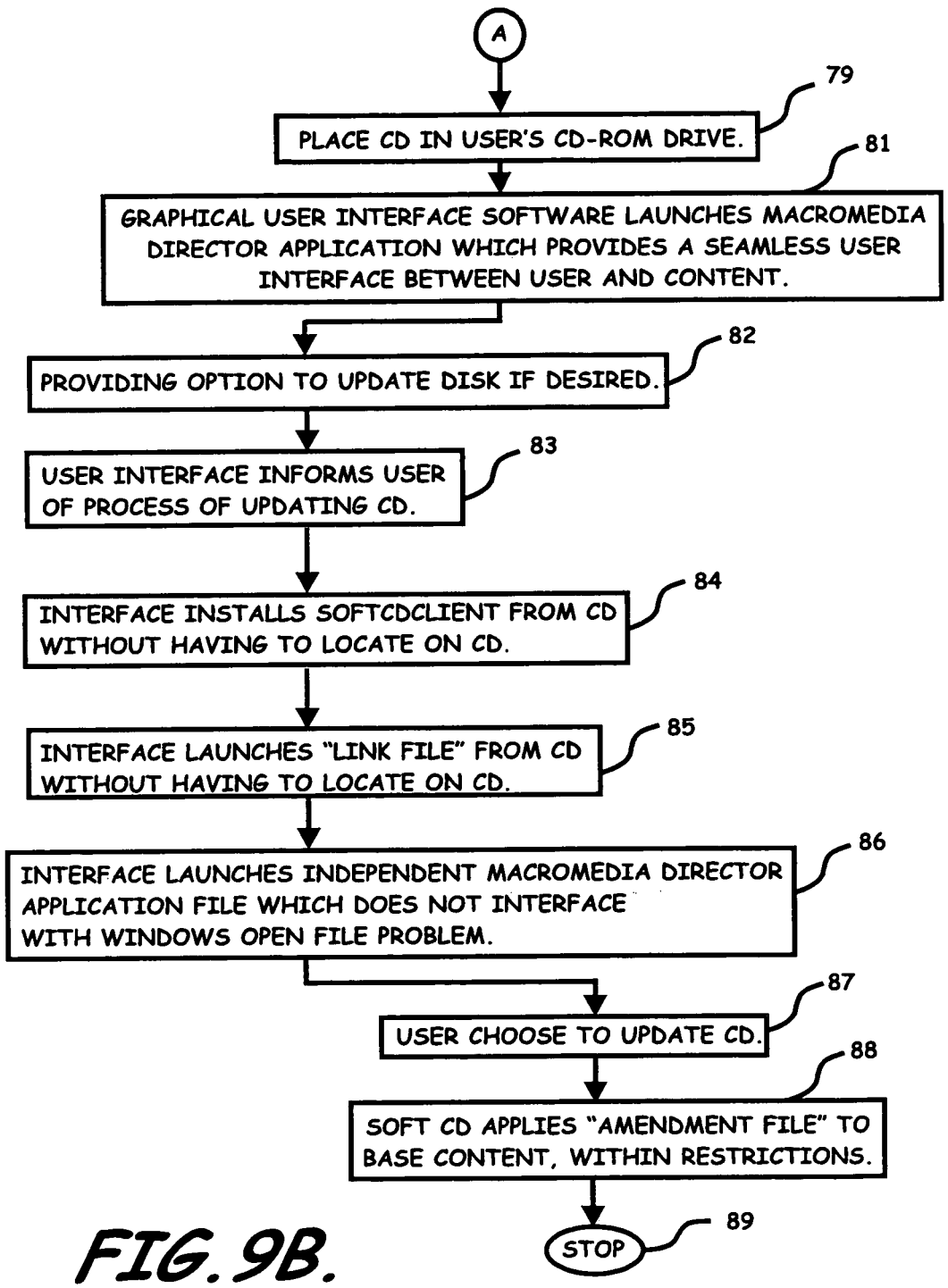
Figure 10:
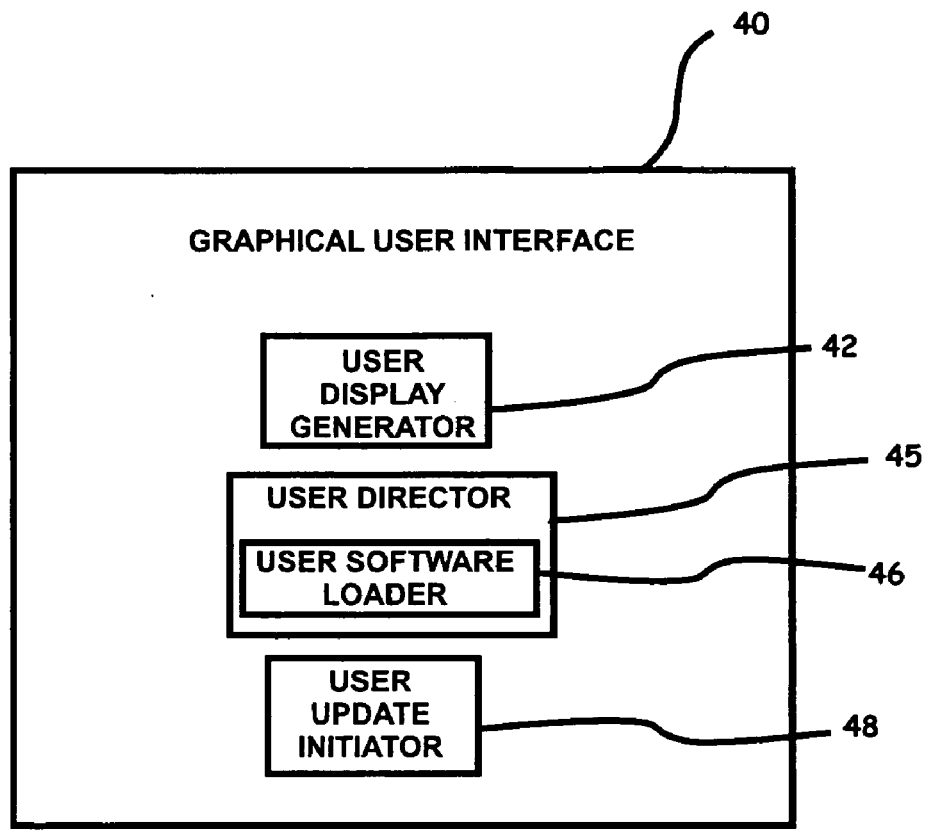
FIG. 10 is a schematic diagram of a graphical user interface stored on a compact disc of a system for updating compact disc cards according to the present invention.

As illustrated in FIGS. 1–10, and more particularly perhaps FIGS. 9A–9B, a method of updating a compact disc card 30 is provided. The method preferably includes providing first compact disc card updating software associated with a computer 16 or 18 defining a server for storing compact disc card update data and positioning a compact disc card 30 in a compact disc drive 22 of at least one remote computer 20 capable of storing digital data thereon 79. The compact disc card 30 preferably includes a seating ring interface seat 35 associated with the compact disc card 30. The method also preferably includes providing second card updating software stored on the compact disc card 30 and in communication with the first compact disc card updating software through a communication link 12, updating digital data stored on the compact disc card 30 by storing the updated data in the memory of the at least one remote computer 20, and producing a graphical user interface 40 to enhance and speed up or quicken update capabilities to a user of the compact disc card 30.

The method can also include directing a user through a plurality of blocks by the graphical user interface 40 to thereby update stored digital data in memory of the at least one remote computer 20 so that the update appears to the user to be on a compact disc card 30, loading card updating software into the memory of the at least one remote computer 20 responsive to the user, and initiating the updating of the updated data from remote card updating software.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

The invention claimed is:

1. A system for updating a compact disc card, comprising:
a first computer having software stored thereon defining a server, the server having first compact disc card updating means associated therewith for storing compact disc card new update data, the first compact disc card updating means initiating a determination of content of a remote compact disc card, comparing original content digital information on the compact disc card with updated information to look for actual changes to the original content digital information, collating the actual changes, compressing data associated with the actual changes, and creating an amendment file containing only differences between the original content digital information and the updated information as reflected by the actual changes;
a communications network in communication with the server;
at least one remote computer in communication with the server through the communications network, said at least one remote computer having a processor for processing digital data, a memory in communication with the processor for storing digital data, a user display in communication with the processor for displaying data to a user, and a compact disc drive positioned to receive at least one compact disc therein; and
a compact disc card positioned in the compact disc drive of said at least one remote computer and containing original content digital information thereon, the compact disc card including:
a seating ring interface seat associated with the compact disc card,
second compact disc card updating means responsive to the first compact disc card updating means for updating the original content digital information with updated information created by storing the amendment file containing only the differences in digital information between the new update information and the original content digital information in the memory of the at least one remote computer, and
graphical user interfacing means stored on the compact disc card and being independent of any graphical user interface otherwise associated with the at least one remote computer for producing a graphical user interface to enhance update capabilities to a user of the compact disc card, the graphical user interfacing means including interface displaying means for displaying a graphical user interface on the user display, user directing means for directing a user through a plurality of blocks for updating the stored digital information in the memory of the at least one remote computer so that the update appears to the user to be on the compact disc card, and update initiating means for initiating updating of the updated information from the first compact disc card updating means associated with the server.

2. A system as defined in claim 1, wherein the directing means includes software loading means displayed to a user for loading the second card updating means into the memory of the at least one remote computer responsive to the user, and wherein the comparing by the first compact disc card updating means includes comparing the entire original content digital information with the updated information.

3. A system as defined in claim 1, further comprising a second computer remote from the first computer and in communication with the first computer through the communications network having software stored thereon and having third compact disc card updating means associated therewith for creating update information for communication to the first compact disc card updating means of the server.

4. A system for updating a compact disc card, comprising:
a computer having software stored thereon defining a server, the server having first compact disc card updating software associated therewith for storing compact disc card new update data, the first compact disc card updating software initiating a determination of content of a remote compact disc card, comparing original content digital information on the compact disc card with updated information to look for actual changes to the original content digital information, collating the actual changes, compressing data associated with the actual changes, and creating an amendment file containing only differences between the original content digital information and the updated information as reflected by the actual changes;
a communications network in communication with the server;
a plurality of remote computers in communication with the server through the communications network, each of the plurality of remote computers having a processor for processing digital data, a memory in communication with the processor for storing digital data, a user display in communication with the processor for displaying data to a user, and a compact disc drive positioned to receive at least one compact disc therein; and a compact disc card positioned in the compact disc drive of at least one of the remote computers and containing original content digital information thereon, the compact disc card including:

a seating ring interface seat associated with the compact disc card, second compact disc card updating software stored on the compact disc card and in communication with the first compact disc card updating software for updating the original content digital information stored on compact disc card by storing only the differences in digital information between the new update information and the original content digital information in the memory of the at least one remote computer, and a graphical user interface stored on the compact disc card and being independent of any graphical user interface otherwise associated with the at least one remote computer for producing a graphical user interface to enhance update capabilities to a user of the compact disc card, the graphical user interface including a user director for directing a user through a plurality of blocks for updating the stored digital information in the memory of the at least one remote computer so that the update appears to the user to be on the compact disc card, and a user update initiator associated with the second compact disc card updating software for initiating updating of the updated information from the first compact disc card updating software associated with the server.

5. A system as defined in claim 4, wherein the graphical user interface further includes a user display generator for displaying a graphical user interface on the user display, wherein the user director includes a software loader displayed to a user for loading the second compact disc card updating software into the memory of the at least one remote computer responsive to the user, and wherein the comparing by the first compact disc card updating software includes comparing the entire original content digital information with the updated information.

6. A system as defined in claim 5, further comprising a second computer remote from the server and in communication with the server through the communications network having software stored thereon and having third compact disc card updating software associated therewith for creating update information for communication to the first compact disc card updating software of the server.

7. A graphical user interface for updating a compact disc card having thereon original content digital information and for enhancing update capabilities to a user of the compact disc card, the graphical user interface comprising:

directing means for directing a user through a plurality of blocks for updating stored digital information in memory of at least one remote computer so that the update appears to the user to be on a compact disc card, the directing means including software loading means displayed to the user for loading card updating software into the memory of the at least one remote computer responsive to the user, wherein the software loading means loads new updating digital information containing only differences defining actual changes in digital information between the new updated digital information and the original content digital information; and update initiating means associated with the card updating software for initiating the updating of the new updated digital information received from remote compact disc card updating software, the update initiating means being responsive to receive the actual changes, the actual changes being initiated responsive to a determination of content of the compact disc card, comparing original content digital information on the compact disc card with updated information to look for actual changes to the original content digital information, collating the actual changes, compressing data associated with the actual changes, and creating an amendment file containing only differences between the original content digital information and the updated information as reflected by the actual chances so that the amendment file containing the actual chances are loaded responsive to the software loading means.

8. A method of updating a compact disc card, the method comprising:

providing first compact disc card updating software associated with a computer defining a server for storing compact disc card new update information;

initiating a determination of content of a remote compact disc card;

comparing original content digital information on the compact disc card with updated information for actual changes to the original content digital information;

collating the actual changes;

compressing data associated with the actual changes:

creating an amendment file containing differences between the original content digital information and the updated information as reflected by the actual changes;

positioning a compact disc card capable of containing original content digital information thereon in a compact disc drive of at least one remote computer;

providing second card updating software stored on the compact disc card and in communication with the first compact disc card updating software through a communication link;

updating the original content digital information stored on the compact disc card by storing the amendment file containing the new update information in the memory of the at least one remote computer, wherein the new update information consists of only differences in digital information between the new update data information and the original content digital information; and producing a graphical user interface on a display of the at least one remote computer to enhance update capabilities to a user of the compact disc card.

9. A method as defined in claim 8, further including:

directing a user through a plurality of blocks by the graphical user interface to thereby update stored digital information in memory of the at least one remote computer so that the update appears to the user to be on a compact disc card;

loading card updating software into the memory of the at least one remote computer responsive to the user; and initiating the updating of the updated information from remote card updating software responsive to the loading card updating software.

* * * * *